Oct. 30, 1951  W. A. HIGINBOTHAM  2,573,021
COMPENSATED PLAN POSITION INDICATOR
Filed Oct. 30, 1944  3 Sheets-Sheet 3

INVENTOR.
WILLIAM A. HIGINBOTHAM
BY
William D. Hall
Attorney

Patented Oct. 30, 1951

2,573,021

UNITED STATES PATENT OFFICE 2,573,021

COMPENSATED PLAN POSITION INDICATOR

William A. Higinbotham, Santa Fe, N. Mex., assignor, by mesne assignments, to the United States of America as represented by the Secretary of War Application October 30, 1944, Serial No. 561,022

8 Claims. (Cl. 343—11)

The present invention relates to radar systems of the plan-position-indicating (PPI) type wherein an image-producing electron beam starts at the center of the screen of a cathode ray tube and moves outward along a radius in a direction corresponding to the direction in azimuth of the radiated beam.

In some PPI systems, the radial deflection of the image-producing electron beam is achieved by the simultaneous application of separate horizontal and vertical sweep voltages to four stationary deflecting elements, either coils or plates, which provide what may be considered $x$ and $y$ components in a system of rectangular coordinates. The produced image bears some definite angular relationship to the "X" and "Y" axes engraved on the face of the indicator, which usually correspond to north-south-east-west coordinates used for indicating the azimuth of the image.

In airborne radar this angular relationship frequently is disturbed or varied due to rotational changes or fluctuations of the radar transmitting antenna relative to ground caused by yawing of a radar-equipped aircraft, which is the rotation of aircraft around its vertical axis because of its deviation from the line of flight. Such yawing causes the indicator image to oscillate around the axes of the indicator-face. Such continuous, erratic, oscillation is undesirable in certain radar systems, as in airborne radar where the plane, despite yawing movements, generally progresses on a given course, and wherein it is desired that the reproduced images remain fairly stationary in azimuth with respect to the true, instantaneous line of flight. A radar system of this nature is disclosed in the copending application of Luis W. Alvarez, Serial No. 542,287, filed June 27, 1944, now Patent No. 2,480,208 granted August 30, 1949.

It is one of the objects of this invention to provide instrumentalities for stabilizing the PPI images against rotational oscillations relative to the direction-signifying axes of the indicator-face, despite the oscillatory rotational changes of the radar transmitting antenna relative to the ground or scanned area due to yawing of an object carrying out radar systems.

Another object of the present invention is to provide stabilization means for a portable PPI radar system, said means counteracting the oscillatory rotational yawing disturbances of an aircraft carrying the indicator apparatus.

Yet another object of my invention is to provide a portable PPI radar system stabilized against yawing of a craft carrying said system, the system including a directional gyroscope, whose shaft is connected to an electrical stabilizer included in a sweep circuit of a PPI indicator.

Still another object of this invention is to provide a variable condenser which is constructed so as to perform electrically the rotation of polar coordinates by any desired angle, thus in effect performing the function which is known in analytical geometry as a transfer of polar coordinates.

Other objects will appear more fully from the following detailed description, accompanying drawings, and appended claims.

Referring now to the drawings, wherein like reference characters indicate like parts, Figure 1 is a block diagram of a portable PPI radar system stabilized against yawing, Figure 2 illustrates the effect of stabilization on the images reproduced on the screen of a cathode ray tube, Fig. 3 is a diagram illustrating the geometry involved in the invention;

Figure 2:
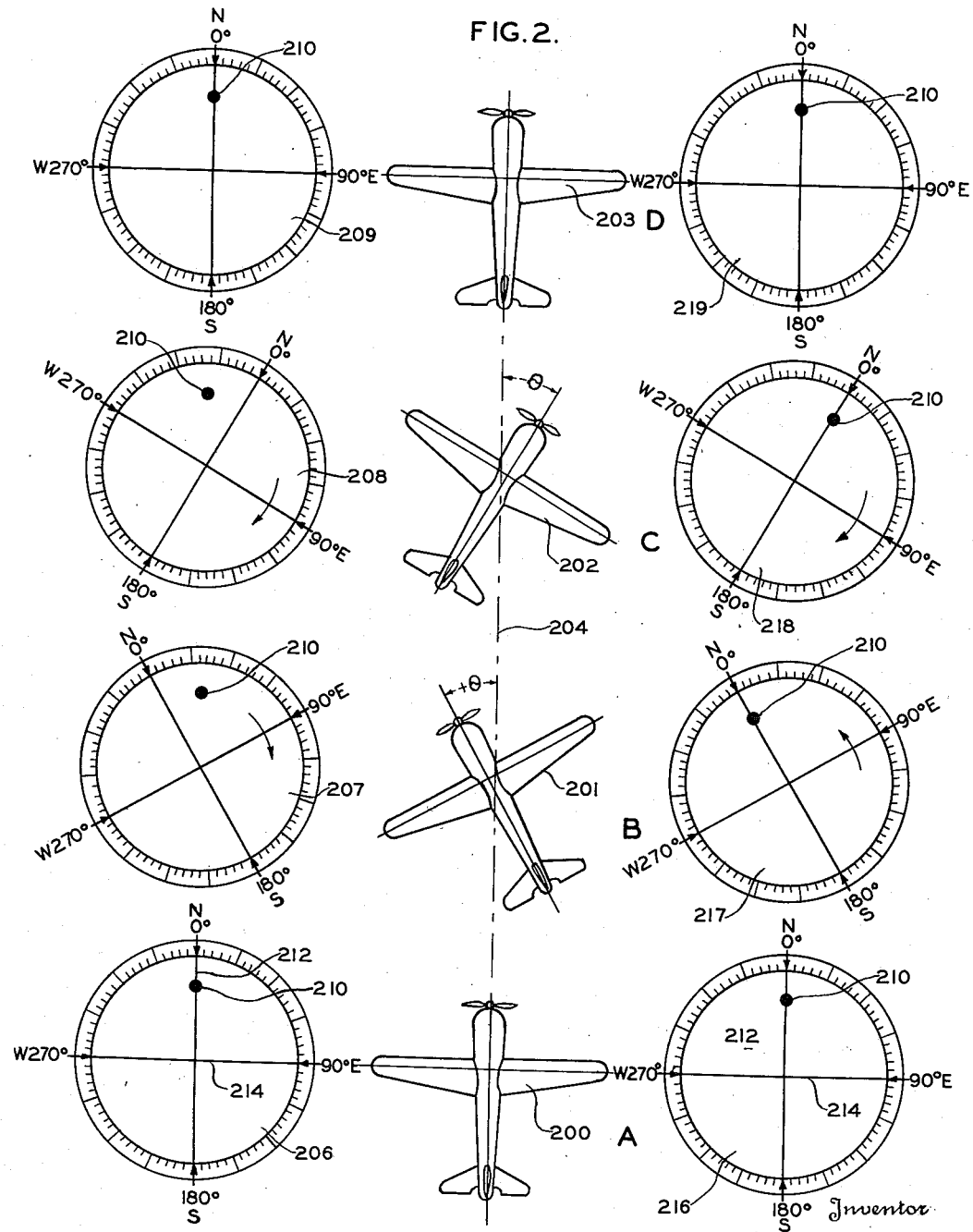

In the PPI radar system, all intercepted echoes are reproduced on the screen of a cathode-ray tube along polar coordinates in terms of range and bearing of all objects "visible" to the radar system. This type of indication may be produced by means of a directional transmitter-receiving antenna rotated around its vertical axis, and a receiver connected to a cathode-ray oscilloscope with a radial sweep synchronously following the rotating antenna. The rotating radial sweep makes an electron beam sweep from the center of a long persistance fluorescent screen of a cathode-ray tube to its outer edge by starting the radial sweep at the instant of transmitting radio frequency pulse. The radial distance on the screen of the cathode-ray tube is made to represent the range of an object while an angle formed between the reference line and radial trace through the center of an echo image is made to represent the bearing of an object, or its azimuth, by rotating the radial sweep about the longitudinal axis of the tube in synchronism and in phase with the rotation of the antenna so that the radial sweep and the axis of the antenna lobe always point in exactly the same direction. When a radio frequency pulse from the transmitter strikes an object, some small portion of energy will be reradiated in the direction of the radio locator receiver, and if the reflected pulse is sufficiently strong, a distinguishable signal or echo is registered by the receiver. These signals are applied to an intensity grid or a cathode of the cathode-ray tube to produce brightening of the cathode-ray trace for each echo received. This is the so-called intensity modulation, and it results in the echoes appearing as bright circular arcs or dots on the fluorescent screen of the oscilloscope, the size of the arcs or dots depending upon the size of the target and the width of the antenna beam. The radial distance in the angular position of the center of such an arc or dot gives respectively the range and the azimuth of the target producing this arc. For obtaining azimuth readings, a circular scale calibrated in degrees is usually provided around the periphery of the cathode-ray screen with a zero degree line pointing to the north, as illustrated in Fig. 2. Some form of range scale is also provided for determining the range of a target; in some instances this scale consists of concentric circles engraved on a transparent grating superimposed over the screen of the tube, and in other instances it consists of marker signals which intensity-modulate the cathode-ray beam so that the marker signals appear as bright dots on the oscilloscope screen.

In the systems of this type, two methods are available for producing the desired radial sweep in the direction corresponding to the direction of the radiated beam. In one method the cathode-ray tube is provided with two magnetic deflection coils. The two deflection coils represent two electromagnets connected directly to a saw-tooth generator in aiding relationship so that these electromagnets produce a beam-deflecting electro-magnetic field. The intensity of this field is proportional to the intensity of the saw-tooth wave current flowing through the two coils. Thus, the electromagnetic field per se would produce only the radial deflection of the cathode-ray beam. In order to produce the PPI presentation of the intercepted echoes, it is necessary to rotate the common axis of the two deflection coils, in synchronism and phase with the rotation of the transmitting-receiving antenna. In the second method, the cathode-ray tube is provided with two pairs of stationary electrostatic deflection plates or two pairs of stationary electromagnetic deflection coils, the axes of one pair being at right angles to the axis of the second pair, both of these axes intersecting the axis of the cathode-ray tube. The advantage of the latter system resides in the fact that it avoids the mechanical difficulties encountered in rotating the deflection coils. However, it now becomes necessary to supply the X and Y components of a saw-tooth wave to the X and Y pairs of the deflecting coils. The invention relates to the latter type of the PPI system, which will be described presently by referring to Fig. 1.

Figure 1:
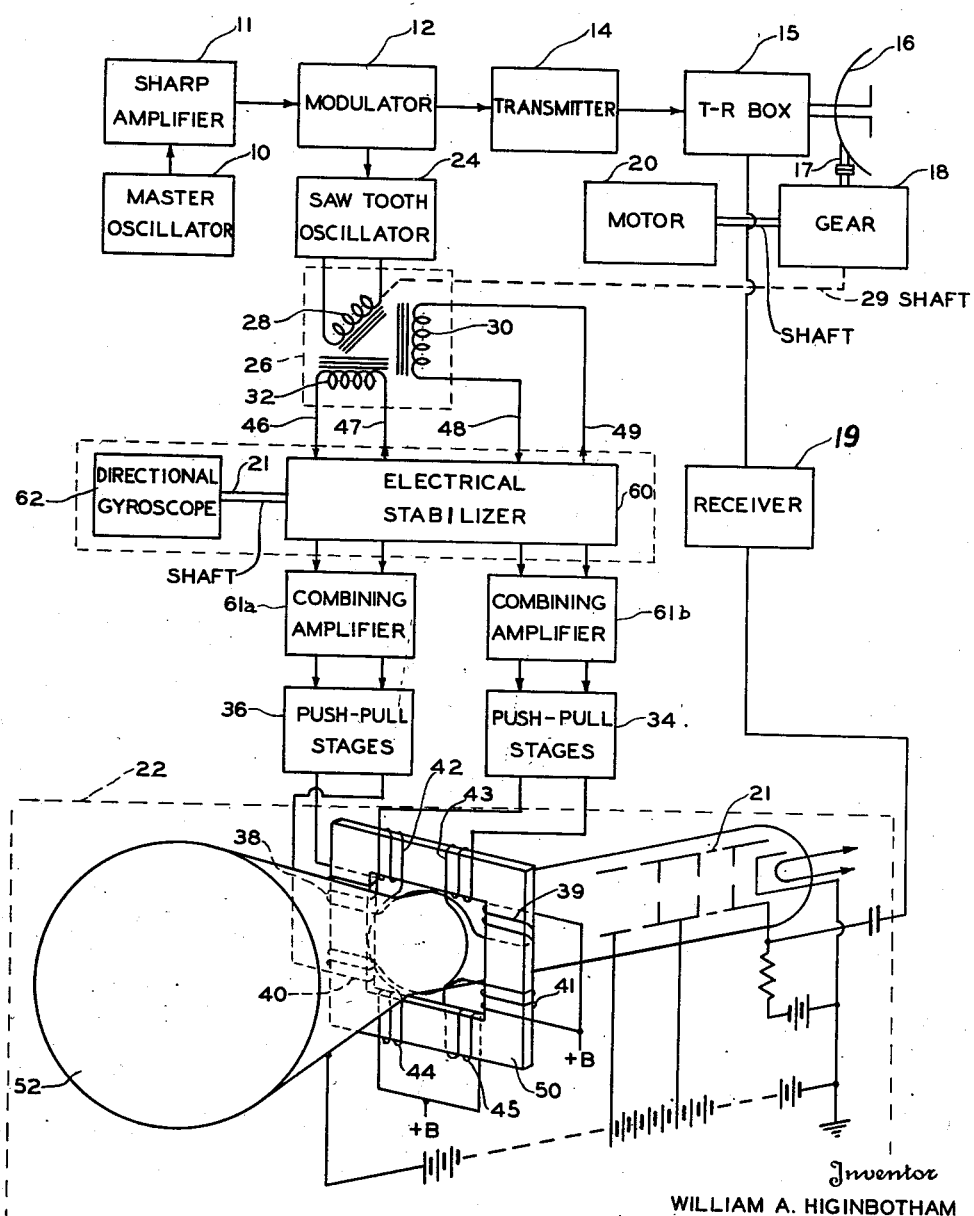

Referring to Fig. 1, a synchronizing oscillator 10, the frequency of which is adjusted to conform with the desired range of the system, generates a sinusoidal wave or a periodic pulse which is impressed on a shaping amplifier 11, and a modulator 12, the latter two transforming the input signal into a series of powerful voltage pulses of very short duration occurring once for each cycle of oscillator 10. These are impressed on a transmitter 14, which generates a UHF pulse whose duration is determined by the duration of the keying pulse. This UHF pulse is impressed on a highly directional antenna 16 through a duplexing circuit or a TR box 15, the antenna transmitting one exploratory pulse for each cycle generated by the synchronizing oscillator 10. In the airborne radar, it is quite customary, in connection with the PPI systems, to scan the terrain under and ahead of the plane by continuously revolving antenna 16 through 360°. To accomplish this result a shaft 17 of the antenna is connected through a gear 18 to an antenna motor 20. If there are any objects within the field of antenna 16 capable of re-radiating the transmitted pulse, a small portion of the transmitted energy will be re-radiated by these objects in the direction of the radio locator, and will reach antenna 16. At this instant antenna 16 acts as a receiving antenna. The received energy is impressed on a duplexing circuit 15 and receiver 19, the output of which is impressed on the intensity grid 21 of the PPI oscilloscope 22. The beam deflecting electrodes of the oscilloscope are connected to oscillator 10, or to modulator 12, through a sweep generating channel. This channel begins with a saw-tooth oscillator 24, the output of which is connected to a special selsyn transformer 26 including rotor primary 28 and secondaries 30 and 32. Rotor 28 is turned mechanically by means of shaft 29, gear 18 and motor 20. Accordingly, the shafts 17, 29 and gear 18 mechanically interconnect the primary 28 of the selsyn transformer with the antenna shaft 17, and the two are rotated in phase and in synchronism by motor 20. The stator or secondary windings 30 and 32 are placed at right angles to each other. As a result, the amplitudes of the induced voltages vary sinusoidally with the rotation of the rotor, the maximum voltage generated in winding 30 lagging by 90° the maximum voltage induced in winding 32. The outputs of the stator windings 30 and 32 in the conventional PPI systems using stationary deflecting means ordinarily are connected directly to push-pull stages 34 and 36. The outputs of the push-pull stages 36 are connected to the horizontal deflecting coils 38 through 41, while the outputs of the push-pull stages 34 are connected to the vertical deflecting coils 42 through 45. The four conductors 46, 47, 48 and 49 carry respectively the currents corresponding to X, —X, Y and —Y components of the saw-tooth wave generated by oscillator 24. These are combined in the stationary yoke 50 of a cathode-ray tube 52, and it is the yoke 50 that eventually produces the desired resultant magnetic field corresponding to the summation of the X and Y components of the saw-tooth wave generated by oscillator 24. The intensity grids of the cathode-ray tube are normally so biased that the electron beam produces only a very faint glow on the screen of the cathode-ray tube 52. When echoes are received by antenna 16 and transmitted to receiver 19, the latter impresses a positive signal on one of the grids of the cathode-ray tube with the appearance of a luminous image on the screen of the oscilloscope. The described PPI system up to this point represents a conventional PPI system.

When a system of this type is mounted on any moving object, such as an airplane or a fast moving boat afflicted with occasional yawing, with the entire radar system being fixedly attached to the plane or the boat, the yawing will produce a corresponding yawing of images on the oscilloscope screen because of yawing of antenna 16 with respect to ground, as illustrated in the left portion of Fig. 2. Four positions, 200 through 203, of an airplane are illustrated in Fig. 2 with respect to the direction of flight or line of flight 204. Since the antenna is attached to the plane, it is obvious that any yawing of the plane will result in the identical yawing of the antenna and of the oscilloscope tube 52. The yawing of the oscilloscope is represented by four positions, 206–209, of the oscilloscope screen. Examination of these four positions reveals the fact that if a stationary object located on scanned terrain produces an echo signal and image 210 on the oscilloscope screen, this object will appear in the continuously varying positions with respect to the reference lines 212 and 214 provided for proper azimuth orientation of the received echo, as illustrated in positions 206 through 209 in Fig. 2. The invention discloses an electrical stabilizer or "an electrical gyroscope" for a portable PPI radar system of the disclosed type in which occasional yawing of an airplane carrying the radar system is counterbalanced by the electrical stabilizer so that the images appearing on the screen of the PPI oscilloscope have a fixed relationship with respect to the reference lines on the oscilloscope screen, and are unaffected by the yawing phenomenon. This is illustrated in Fig. 2 at positions 216 through 219 which illustrates the same object 210 in fixed position with respect to the same reference axes 214 and 212 in spite of the fact that the radar carrying plane 202 suffers from the same yawing phenomenon. This is accomplished by inserting an electrical stabilizer 60 and vector-combining amplifiers 61 between transformer 26 and the push-pull stages 34 and 36, this stabilizer being connected to the directional gyroscope 62 of the plane. As is well known, the directional gyroscope is unaffected by the yawing phenomenon, and since shaft 21 of the gyroscope is directly connected to the electrical stabilizer, it becomes possible to maintain one part of the stabilizer in fixed position with respect to the line of flight 204 by means of the directional gyroscope 62 while the yawing motion of the plane is transmitted to that part of the stabilizer which is attached to the plane, and, therefore follows its yawing movements. The movement of the two parts of the stabilizer with respect to each other is utilized for introducing such corrective electrical vectors of voltage and current into the sweep circuits of the oscilloscope as to shift electrically in azimuth the position of image 210 on the oscilloscope screen to the extent of yawing of the plane. Therefore, the position of the image with respect to the axes 212 and 214 is not affected by the yawing phenomenon. The electrical stabilizer takes the form of a special variable condenser whose rotors are connected to shaft 21 of the directional gyroscope 62 and whose stators are fixedly connected to the plane, shaft 21 of the directional gyroscope acting as an axis and shaft of this variable condenser. The function performed by this condenser is described below.

In general, a point trace is made on the face or screen of a cathode ray tube in a manner well known to the art. Horizontal and vertical deflection plates or other deflection means are supplied with sweep voltages for deflection of the electron beam, and the beam is intensified at the instants when the control grid of the tube is energized. Luminous spots are thus produced upon the screen at positions which are determined by the values of the sweep or deflection voltages existing at the instants of beam intensification.

Since the rectangular coordinates of the spots produced are at all times proportional to and determined by the deflection voltages, for the sake of convenience said voltages will be identified by the same characters used to represent the coordinates corresponding thereto. It is also to be understood that all references to voltages signify voltages with respect to a point in the electrical circuit at ground or chassis potential.

Figure 3:
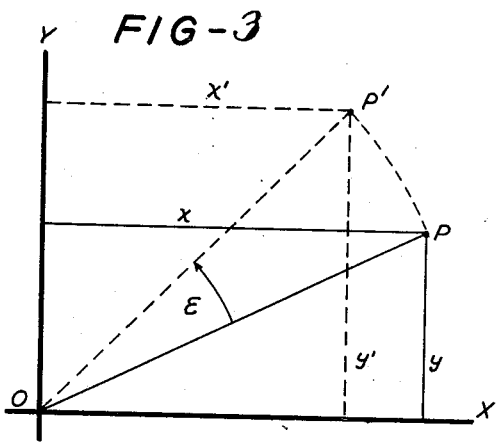

Referring now to Fig. 3, OX and OY represent the reference axes 212 and 214 of the cathode-ray tube previously discussed in connection with Fig. 2. A luminous spot P on this presentation has the coordinates $x$, $y$. A rotation of point P about O through an angle $\epsilon$ to position P' would give the point P' new coordinates $x'$, $y'$ with respect to axes OX and OY. Such a rotation would ordinarily take place due to the yawing rotation of the radar antenna clockwise through an angle $\epsilon$, as seen from above the antenna. In terms of $x'$, $y'$, and angle $\epsilon$, coordinates $x$ and $y$ are given by the equations:

$$x = x' \cos \epsilon + y' \sin \epsilon \quad (1)$$
$$y = -x' \sin \epsilon + y' \cos \epsilon \quad (2)$$

Thus, with a clockwise rotational displacement of the radar antenna through the angle $\epsilon$, if there were some manner by which the voltages locating the spot P' at the coordinates $x'$, $y'$ could be modified to reposition the spot to point P at the coordinates $x$, $y$, the spot would be correctly positioned on the screen relative to the reference axes despite the rotational displacement of the antenna due to yawing of the plane.

Figure 4:
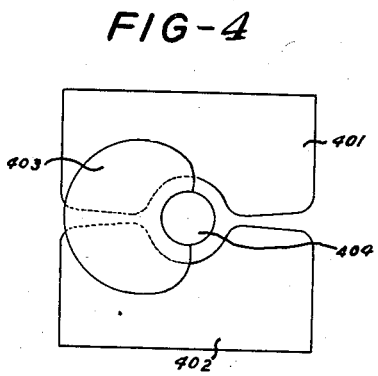
Fig. 4 is a plan view of one form of variable dual-capacitor which may comprise a component of the electrical stabilizer.
Figure 5:
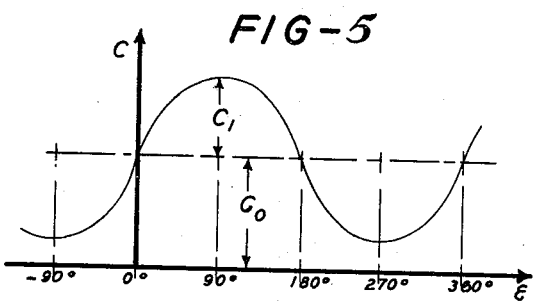
Fig. 5 illustrates graphically the operating characteristic of one section of this variable dual-capacitor.

An element of one means for accomplishing such voltage modification is illustrated in Fig. 4, which is a plan view of a variable dual-capacitor having coplanar stator plates 401 and 402, and a common rotor plate 403 mounted on a shaft 404 in such fashion as to overlap variably both stator plates 401 and 402 depending upon the rotational displacement of the rotor shaft 404. Such a capacitor thus constitutes two individual capacitors. Taking the relative position of the rotor plate shown in Fig. 4 as that of zero angular displacement, and assuming a clockwise displacement of the rotor to be a positive rotation, the capacitance between stator plate 401 and the rotor plate 403 is a function of shaft rotation $\epsilon$, as shown in the graph of Fig. 5. The shape of the capacitor plates 401 and 403 may be so designed as to produce a sinusoidal variation of capacitance. The capacitance C existing between stator 401 and rotor 403 may be represented by the equation $C = C_0 + C_1 \sin \epsilon$, where $C_0$ and $C_1$, as shown in Fig. 5, are determined by the design of the capacitor, while the capacitance between stator 402 and the rotor 403 may be represented by the equation $C = C_0 - C_1 \sin \epsilon$.

If the rotor is displaced through a positive angle equal to a quarter revolution and this position is regarded as the new zero position, the equations of capacitance between stator 401 and the rotor, and between stator 402 and the rotor may be represented by $C = C_0 + C_1 \cos \epsilon$, and $C = C_0 - C_1 \cos \epsilon$, respectively. Similarly, if the rotor of Fig. 4 is displaced by a half revolution, and this position is regarded as a new zero position, the equations of capacitance between stator 401 and the rotor, and stator 402 and the rotor, may be represented by $C = C_0 - C_1 \sin \epsilon$ and $C = C_0 + C_1 \sin \epsilon$, respectively.

It is to be understood that stator plate 401 may constitute one plate of a set of identical plates stacked in parallel spaced relation, as may also stator plate 402 and rotor plate 403, so that the dual-capacitor will comprise a multiplicity of stator plates 401 and 402 and rotor plates 403 with the latter being interleaved between the former.

Figure 6:
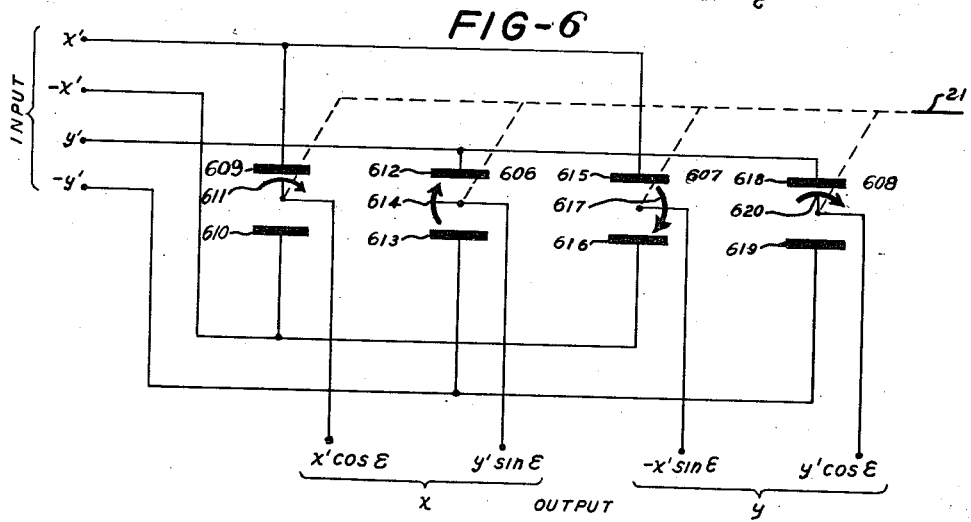
Fig. 6 is a diagram of a capacitor arrangement constituting one illustrative embodiment of the electrical stabilizer.

Referring now to Fig. 6, an arrangement utilizing the above-described variable dual-capacitors is there shown diagrammatically. Four dual-capacitors 605, 606, 607 and 608 are provided, each having a rotor and two stator sections. The rotors are each shown in their respective positions corresponding to zero angular displacement, and the rotor shafts of the said capacitors are mechanically coupled to a common shaft 21, so that on rotation of the latter, they will be jointly angularly displaced through a given angle $\epsilon$.

The diagrammatic representation of the capacitors includes an indication of the relative position of the rotors. The relative position of rotor 614 of dual-capacitor 606 corresponds to the relative position of rotor 403 of the dual-capacitor shown in Fig. 4, so that the rotor 614, is symmetrically meshed with the two stator sections 612 and 613. Dual-capacitor 606 is therefore arranged for sine variations of capacitances. Dual-capacitors 605 and 608 are arranged for identical cosine variations of capacitances, and dual-capacitor 607 is arranged for sine variations of capacitances opposite to those dual-capacitor 606.

The arrangement shown in Fig. 6 corresponds to the electrical stabilizer 60 of Fig. 1 and has applied thereto the uncorrected deflection voltages $x'$ and $y'$. It also requires the application of their negative counterparts $-x'$ and $-y'$, as it has been pointed out in connection with Fig. 1. These voltages are applied to the stators as shown in Figs. 1 and 6 in such fashion as to produce voltages at the rotor terminals which respectively constitute the several equation components required to produce the corrected voltages $x$ and $y$, or values proportional thereto. The voltages $x'$ and $-x'$ applied to stators 609—610, and 615—616 of dual-capacitors 605 and 607, respectively, will produce the component voltages $x' \cos \epsilon$ and $-x' \sin \epsilon$, or values proportional thereto, at rotors 611 and 617, respectively. Similarly, the voltages $y'$ and $-y'$ applied to stators 612—613, and 618—619 of dual-capacitors 606 and 608, respectively, will produce the component voltages $y' \sin \epsilon$ and $y' \cos \epsilon$, or values proportional thereto, at rotors 614 and 620, respectively. These component voltages are combined, in accordance with the equations for $x$ and $y$ given above, either by means of a suitable coupling connection or through suitable addition circuits or vector-coupling amplifiers 61 well known in the art and illustrated in Fig. 1 in block form. The resultant output voltages $x$ and $y$ may be further amplified as necessary in driving stages to furnish ultimate deflection voltages of the proper magnitude for the cathode ray tube beam. Or, if desired, amplification may be introduced into the uncorrected $x'$ and $y'$ voltage circuits ahead of the capacitor arrangement shown in Fig. 6 to increase the voltages applied to the stator plates of said capacitors to values which will result in output voltages $x$ and $y$ of the proper magnitudes for direct application to the cathode by tube. The outputs of the amplifiers 61 are then impressed on the push-pull stages 34 and 36 of the conventional PPI system.

As stated previously the positioning of the capacitor rotors is accomplished by a directional gyroscopic apparatus 62, which will at all times cause the common shaft 21 to rotate through an angle $\epsilon$ corresponding, for example, to the changing yaw angle of the aircraft or other craft upon which the radar antenna may be mounted.

If desired, the angle $\epsilon$ may include not only the angle of rotational yawing movement of the antenna, but may also include a constant angle, changeable at the will of the operator, corresponding or equal to the fixed angle, if any, between the normal direction of the antenna and any desired reference line upon the surrounding terrain. Thus, if it is desired to change the reference direction, as for example when the aircraft course is changed, this may be accomplished for example by changing the axis of the gyroscopic device. Such gyroscopic apparatus is well known and need not be described here in detail.

Thus, an electrical stabilizer in a form of a mutiple capacitor apparatus connected to a gyroscope as described may be utilized to form corrected sweeps for a cathode ray tube, the instantaneous positions of the capacitors being determined by rotational displacements of the antenna and the desired position of a reference direction.

The invention may be put to many other uses, for example, in television apparatus, electronic calculating circuits to perform mathematical operations upon desired quantities, etc.

While the preferred embodiment and a specific application of the invention have been described, it is apparent that the invention is by no means limited to the exact form illustrated or the use indicated, but that many variations may be made in form and in the purpose for which it is employed without departing from the scope of the invention as set forth in the appended claims.

What is claimed as new is:

1. In an electronic mapping system for use on an aircraft, including a cathode ray tube having a screen and a source of sweep deflection voltages for producing on said screen a map-like representation oriented on said screen in a position dependent upon the direction in which said aircraft points, and means for stabilizing said map-like representation against rotary displacement when said aircraft yaws, said means including a gyroscopic device, and a multiple variable-capacitor deflection-voltage-correcting arrangement controlled by said device for modifying the deflection voltages in accordance with the yaw angle, whereby the orientation of the representation on the aforesaid screen is unaffected by said yaw.

2. In a craft having therein electronic indicating apparatus including a cathode ray tube having a control grid circuit for beam intensification by signal pulses, beam-deflection means, an indicating screen and an input sweep voltage circuits for deflection of the electron beam in said tube to form a representation upon said screen, and means for modifying said input sweep voltages so to compensate for the yaw of said craft by rotating the representation through the yaw angle, said means including a multiple capacitor having a plurality of stators fixed with respect to said craft and a plurality of rotors angularly displaced with respect to each other, and a directional gyroscope coupled to said rotors for rotating said rotors in unison through said yaw angle.

3. In a portable plan position indicating radar system subjected to yawing oscillations with respect to a line of movement of a yawing craft carrying said system, said system having a directional gyroscope and an oscilloscope for reproducing received echoes as luminous images on the screen of said oscilloscope, the method of electrically stabilizing azimuth positions of said images against said yawing oscillations which includes the following steps: generating two synchronously modulated, in-phase sweep voltages for producing rotating radial deflections in said oscilloscope, the modulation of one voltage being 90 degrees out of phase with the modulation of the other voltage, varying, by means of relative movement of said craft because of yawing with respect to said gyroscope, the magnitude of the modulation components of said voltages to counteract electrically said yawing oscillations, and applying the corrected components of said voltages to said oscilloscope whereby said images are reproduced in fixed relationship with respect to said line of movement in spite of the yawing oscillations of said systems.

4. In a portable plan position indicating radar system subjected to yawing oscillations of a yawing craft carrying said system, said yawing oscillations being expressed in terms of an angle of yaw between the line of flight and the longitudinal axis of said craft and having an instantaneous value of $+\theta$ in one direction and $-\theta$ in the other direction, said system having an oscilloscope for reproducing received echoes as luminous images on the screen of said oscilloscope, the method of electrically stabilizing azimuth positions of said images against said yawing oscillations which includes the steps of: generating first and second saw-tooth waves in phase with respect to each other but sinusoidally varying in amplitude with the maximum amplitude of one wave being 90 degrees out of phase with the maximum amplitude of the second wave, the instantaneous amplitude values of said first and second waves being expressed in terms of X and Y vectors, transforming said vectors into respective X, $-X$, Y and $-Y$, vectors of four saw-tooth waves, the vectors of said last waves having identical phase and amplitude relationships as the respective parent X and Y vectors, but the $-X$ and $-Y$ vectors having polarities opposite to the polarities of the X and Y vectors, simultaneously varying the amplitudes of said last vectors to derive $X \cos \theta$ and $-X \sin \theta$ vectors from said X and $-X$ vectors respectively where $\theta$ is said instantaneous value of said angle of yaw, and $Y \sin \theta$ and $Y \cos \theta$ vectors from said Y and $-Y$ vectors respectively where $\theta$ is said instantaneous value of said angle of yaw, said $\theta$ having positive and negative signs, depending on the direction of yaw, adding vectorially the $X \cos \theta$ and $Y \sin \theta$ vectors in one circuit for producing a first yaw-corrected saw-tooth wave, adding vectorially the $-X \sin \theta$ and $Y \cos \theta$ vectors in the other circuit for producing a second yaw-corrected saw-tooth wave, varying said angle $\theta$ so that said angle is continuously equal in magnitude and sign to the angle of yaw in either direction, and applying said first and second yaw-corrected waves to said oscilloscope, whereby said images are reproduced in fixed relationship with respect to said line of movement in spite of yawing of said system.

5. A portable plan position indicating radar system subjected to yawing oscillations by a yawing craft carrying said system, said system including an oscilloscope for reproducing received echoes in terms of azimuth and range of the objects producing said echoes, a sweep channel, including a saw-tooth oscillator, connected to said oscilloscope, said channel generating two in-phase sweep voltages, said voltages being sinusoidally modulated 90 degrees out of phase, whereby said voltages produce in said oscilloscope rotating radial sweeps, and an electrical stabilizer connected between said oscillator and said oscilloscope, said stabilizer including a directional gyroscope controlling the mechanical position of one part of said electrical stabilizer for varying said voltages to counteract electrically in said oscilloscope the yawing oscillations of said system.

6. A portable plan position indicating radar system as defined in claim 5 in which said stabilizer includes a ganged condenser having a plurality of stators and a corresponding plurality of rotors mounted on a common shaft, said shaft being connected to said gyroscope, and the stators being mechanically connected to said craft, whereby said stators yaw with said craft, and said rotors are held in fixed position by said gyroscope, the relative movements of said stators with respect to said rotors electrically counteracting said yawing.

7. A portable plan position indicating radar system as defined in claim 5 in which said stabilizer includes a ganged condenser having a plurality of stators yawing with said craft, and a plurality of rotors held in fixed angular position with respect to said objects by said gyroscope during the yawing oscillations of said craft, the plates of said rotors and said stators being shaped to introduce the sine and cosine corrections into said voltages in response to the relative angular rotations of said stators with respect to said rotors, said corrections electrically counteracting in said oscilloscope said yawing.

8. A portable plan position indicating radar system having a transmitting channel including a transmitting-receiving antenna, said antenna periodically transmitting exploratory pulses and receiving echoes of said pulses, a receiving channel connected to said antenna, said receiving channel including a receiver connected to said antenna, a cathode-ray tube having an intensity grid connected to said receiver, a sweep circuit for said tube including a saw-tooth oscillator controlled by said transmitting channel, a selsyn transformer having a primary winding connected to said saw-tooth oscillator, means for synchronously rotating said primary and said antenna, two secondaries at 90 electrical degrees with respect to each other and said primary, an electrical stabilizer connected to said secondaries, a directional gyroscope, mechanical connection between said gyroscope and said electrical stabilizer for modifying the electrical parameters of said stabilizer to counteract electrically the yawing oscillations of said system, and a sweep producing circuit connected to said stabilizer and to said tube, said circuit being controlled by said electrical stabilizer to reproduce said echoes on the screen of said oscilloscope in fixed relationship with respect to said line of movement of said system in spite of the yawing oscillations of said system.

WILLIAM A. HIGINBOTHAM.

REFERENCES CITED

The following references are of record in the file of this patent:

UNITED STATES PATENTS

| Number | Name | Date |
|---|---|---|
| 1,872,299 | Kerringan | Aug. 16, 1932 |
| 2,153,140 | Diehl et al. | Apr. 4, 1939 |
| 2,208,379 | Luck | July 16, 1940 |
| 2,241,809 | De Forest | May 13, 1941 |
| 2,366,355 | Roberts | Jan. 2, 1945 |
| 2,401,432 | Luck | June 4, 1946 |
| 2,403,562 | Smith | July 9, 1946 |
| 2,408,848 | Hammond | Oct. 8, 1946 |
| 2,412,670 | Epstein | Dec. 17, 1946 |
| 2,418,465 | Doba | Apr. 8, 1947 |
| 2,421,747 | Engelhardt | June 10, 1947 |
| 2,422,697 | Meacham | June 24, 1947 |